(12) United States Patent
Favagrossa

(10) Patent No.: US 10,882,497 B2
(45) Date of Patent: Jan. 5, 2021

(54) BRUSH CONSTRUCTION FOR MOTOR VEHICLE WASHING SYSTEMS

(71) Applicant: FAVAGROSSA EDOARDO S.r.L., Casalmaggiore (IT)

(72) Inventor: Leonardo Favagrossa, Viadana (IT)

(73) Assignee: FAVAGROSSA EDOARDO S.r.L., Casalmaggiore (IT)

( * ) Notice: Subject to any disclaimer, the term of this patent is extended or adjusted under 35 U.S.C. 154(b) by 499 days.

(21) Appl. No.: 15/639,995

(22) Filed: Jun. 30, 2017

(65) Prior Publication Data

US 2018/0009419 A1   Jan. 11, 2018

(30) Foreign Application Priority Data

Jul. 5, 2016 (IT) .......................... 102016000069900
Jun. 12, 2017 (EP) ...................................... 17175484

(51) Int. Cl.
| | |
|---|---|
| *B60S 3/06* | (2006.01) |
| *A46B 9/02* | (2006.01) |
| *B60S 3/04* | (2006.01) |
| *A46B 13/00* | (2006.01) |
| *A46B 13/02* | (2006.01) |

(52) U.S. Cl.
CPC ..................................... *B60S 3/06* (2013.01); *A46B 9/02* (2013.01); *A46B 9/025* (2013.01); *A46B 9/028* (2013.01); *A46B 13/008* (2013.01); *A46B 13/02* (2013.01); *B60S 3/042* (2013.01); *A46B 2200/3046* (2013.01)

(58) Field of Classification Search
CPC .................. A46B 13/00; A46B 13/008; A46B 2200/3046; A46B 9/02; A46B 9/025; A46B 9/028; B60S 3/06; B60S 3/04; B60S 3/042
See application file for complete search history.

(56) References Cited

U.S. PATENT DOCUMENTS

| | | | |
|---|---|---|---|
| 4,192,037 A | 3/1980 | Capra | |
| 6,564,416 B1* | 5/2003 | Claire | A46B 9/045 15/167.1 |
| 2008/0229529 A1* | 9/2008 | Viner | A46B 11/066 15/29 |
| 2011/0047736 A1* | 3/2011 | Jimenez | A46B 9/04 15/167.2 |

(Continued)

FOREIGN PATENT DOCUMENTS

| | | |
|---|---|---|
| DE | 1655989 | 8/1971 |
| KR | 10-2012-0063899 | 6/2012 |

*Primary Examiner* — Andrew A Horton
(74) *Attorney, Agent, or Firm* — Jeffrey N. Townes; Cozen O'Connor

(57) ABSTRACT

A brush construction for motor vehicle washing systems comprises a base plate (2) that supports a plurality of bristles (3) each of which has a base end (31), fixed to the plate (2), and a free end (32); the base plate (2) is suitable for being removably fixed to a rotating construction that is suitable for rotating the base plate (2) around the central axis thereof; the bristles (3) are fixed to the base plate (2) with different tilts both in radial directions, inwardly and outwardly, both in non-radial directions, clockwise and anticlockwise, with respect to the rotation direction of the base plate (2) or in any other direction that is different from the preceding directions; the bristles (3) being arranged with mutually converging and/or diverging tilt directions.

15 Claims, 7 Drawing Sheets

(56) References Cited

U.S. PATENT DOCUMENTS

2015/0274136 A1 10/2015 Belanger et al.
2016/0135579 A1* 5/2016 Tschol .................... A46B 9/02
                                                       15/167.1

* cited by examiner

BRUSH CONSTRUCTION FOR MOTOR VEHICLE WASHING SYSTEMS

CROSS-REFERENCE TO RELATED APPLICATIONS

This application claims priority to Italian Patent Application No. 102016000069900, filed Jul. 5, 2016 and to European Patent Application No. 17175484.9, filed on Jun. 12, 2017, both of which are herein incorporated by reference in their entirety.

DESCRIPTION

The object of the present invention is a brush construction for motor vehicle washing systems.

As is known, car washes comprise a series of rotating brushes, of various shapes and dimensions that are suitable for cleaning different parts of the vehicle.

To clean the wheels, brushes with a circular base are provided that rotate according to a horizontal axis, which are brought up to each wheel of the vehicle.

Currently used brushes for rims consist of bristles arranged axially on a base plate that is rotated around the central axis thereof.

The bristles can be tilted radially, outwards, so as to give a frustoconical shape to the brush to increase the surface of action with respect to the circumference of the base plate, which has standard dimensions to be fitted to existing motor vehicle washing systems.

FIG. 11 illustrates an example of standard installation that is provided with a brush of traditional type.

The brushes act together with high-pressure water jets to clean and rinse the wheels.

Special brushes are known consisting of a series of disks of reduced dimensions fitted to a base plate through complicated and costly movement mechanisms that enable disks to be rotated independently of the base plate.

Already for several years, motor vehicles have very often been equipped with spoked wheels, the cleaning of which by automatic rotating brushes is difficult and incomplete.

In fact, the bristles of the brushes that are currently used are unable to reach effectively the sides of the spokes of the wheels and it is necessary to clean each spoke manually if perfect washing of the vehicle is desired.

Also brushes with multiple disks are not completely effective in cleaning spoked wheels and in all cases using brushes with multiple disks constitutes a huge cost that is not justified by the results achieved.

The task of the present invention is to make a brush construction that has been particularly designed for washing the wheels of motor vehicles that is able to clean effectively any type of wheel and in particular spoked wheels.

In the context of this task, one aim of the invention is to make a brush construction that can be fitted to existing systems.

Another aim is to make a brush construction that, together with effective and complete cleaning, enables water and chemical detergents consumption to be reduced.

A further aim of the present invention is to provide a construction that can be produced using elements and materials that are easily available commercially and is further competitive from an economic point of view.

The present construction, owing to the particular manufacturing features thereof, is able to ensure the greatest guarantees of reliable and safe use.

This and other aims, which will be highlighted better below, are achieved by a brush construction for motor vehicle washing systems, characterised in that it comprises a base plate that supports a plurality of bristles, each of which has a base end, fixed to the plate, and a free end; said base plate is suitable for being removably fixed to a rotating construction that is suitable for rotating said base plate around the central axis thereof; said bristles are fixed on said base plate with different tilts both in radial directions, inwardly and outwardly, both in non-radial directions, either in a clockwise or anticlockwise direction, with respect to the rotation direction of the base plate or in any other direction that is different from the preceding directions; said bristles being arranged with mutually converging and/or diverging tilt directions.

Further features and advantages of the object of the present invention will be more clearly highlighted by an examination of the description of a preferred but non-exclusive embodiment of the invention that is illustrated by way of indicative and non-limiting example in the attached drawings, in which.

Figure 1:
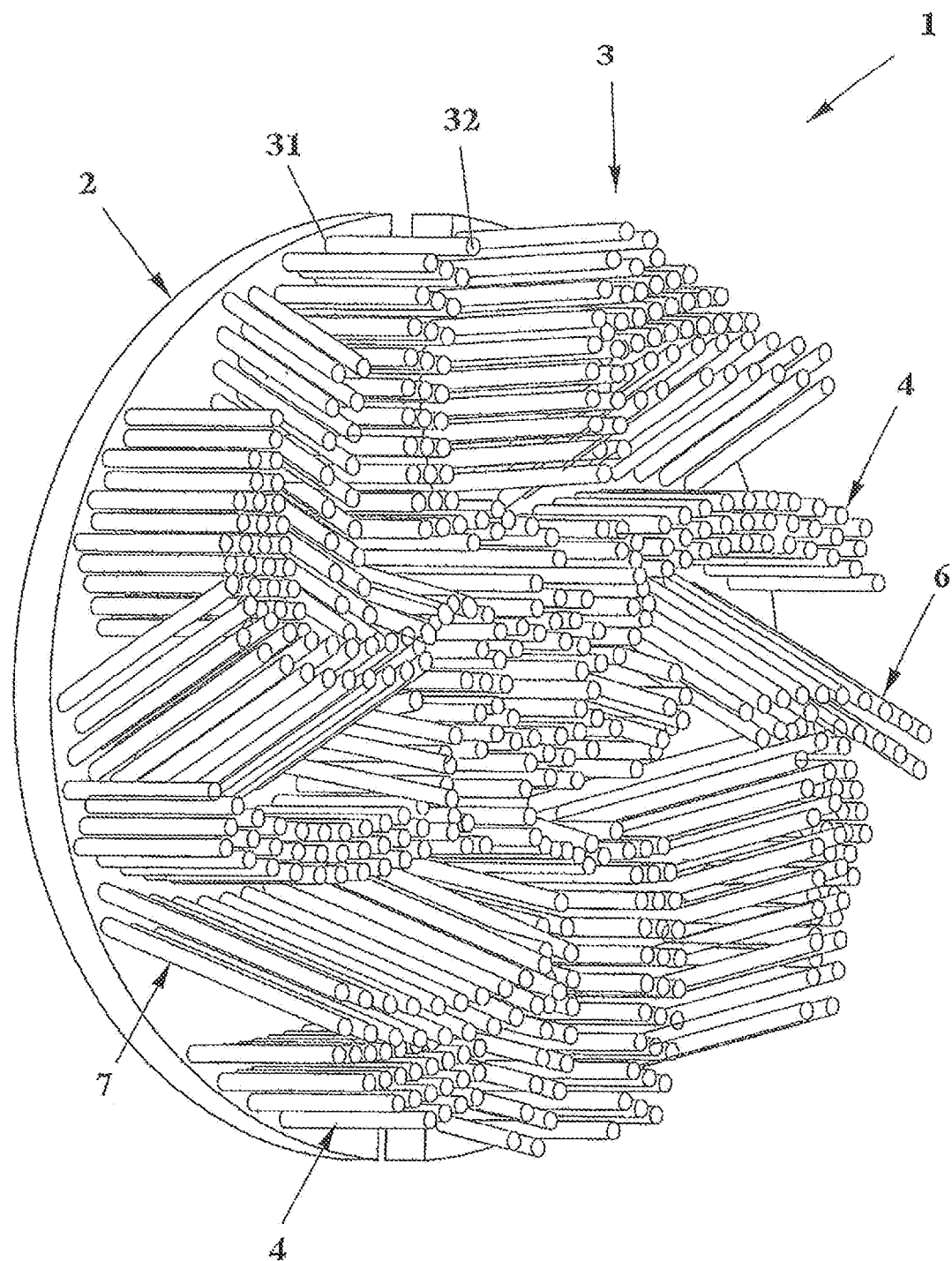
FIG. 1 is a perspective view of a brush construction according to the present invention.

With particular reference to the numeric symbols of the aforesaid figures, the brush construction for motor vehicle washing systems, according to the invention, indicated overall by the reference number 1, comprises a base plate 2 that supports a plurality of bristles 3, each of which has a base end 31, fixed to the plate 2, and a free end 32. Advantageously, the base plate 2 is at least partially (or completely) made of plastics or metal material.

The base plate 2 is suitable for being removably fixed to a rotating construction, which is not visible in the figures, which is suitable for rotating the plate 2 around the central axis thereof.

According to the present invention, the bristles 3 are fixed to the plate 2 with different tilts both in radial directions, inwardly and outwardly, both in non-radial directions, in a clockwise and anticlockwise direction with respect to the rotation direction of the disk or in any other direction that is different from the preceding directions.

In particular, the bristles can be arranged with mutually converging and/or diverging tilt directions.

Also the degree of tilt of each bristle, i.e. the angle formed by the bristle with the base plate 2, is variable.

According to a further aspect of the invention, the bristles 3 are fixed to the plate in sets separated by free zones so as to maintain a spacing between sets of bristles with different tilts.

In other words, the bristles can be placed in various sets in each of which the bristles have homogeneous tilts but different tilts from set to set.

According to a further aspect of the invention, the sets of bristles can have different heights.

Figure 2:
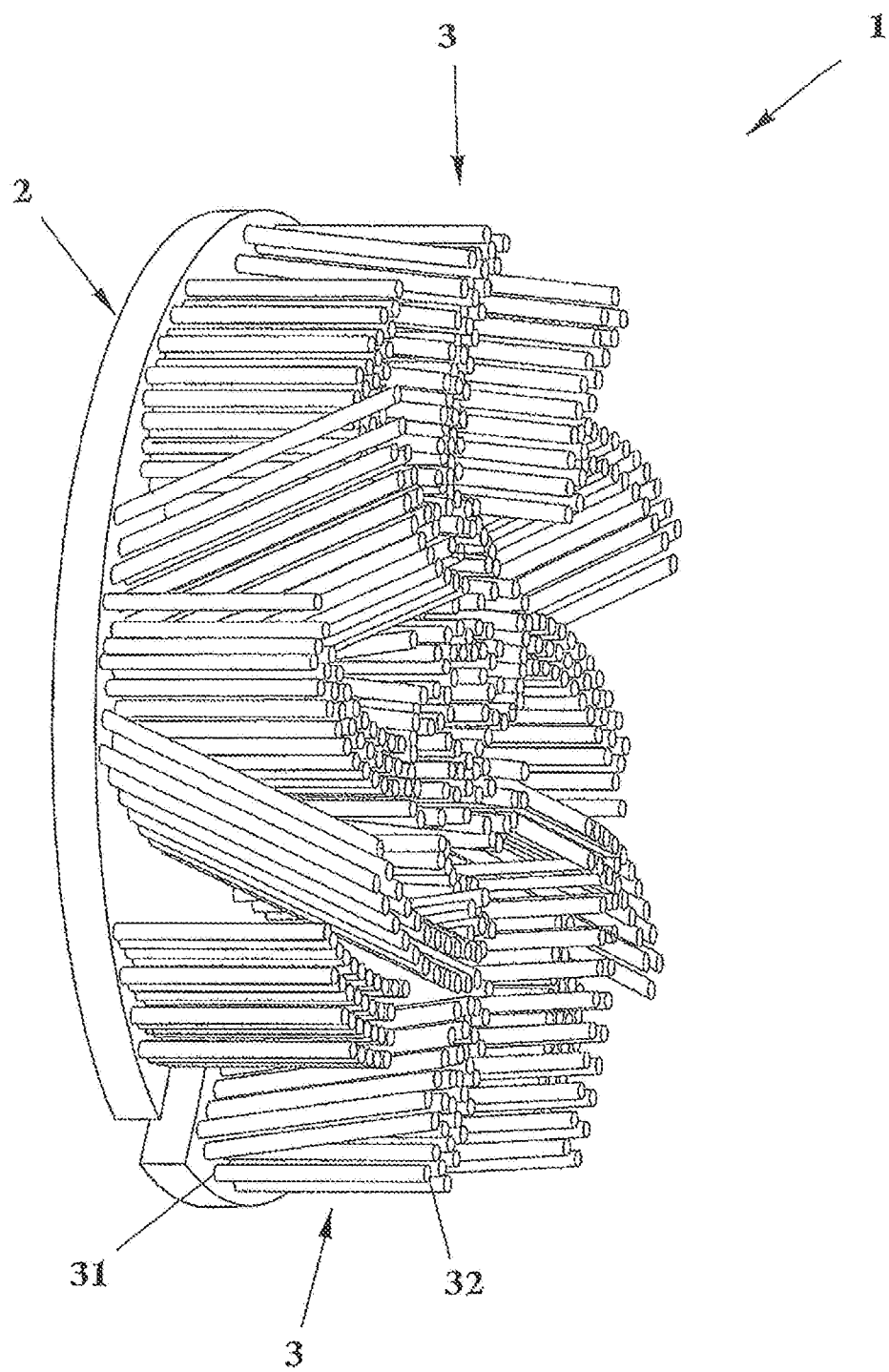
FIG. 2 is another perspective view of the brush construction that is the object of the present invention.
Figure 5:
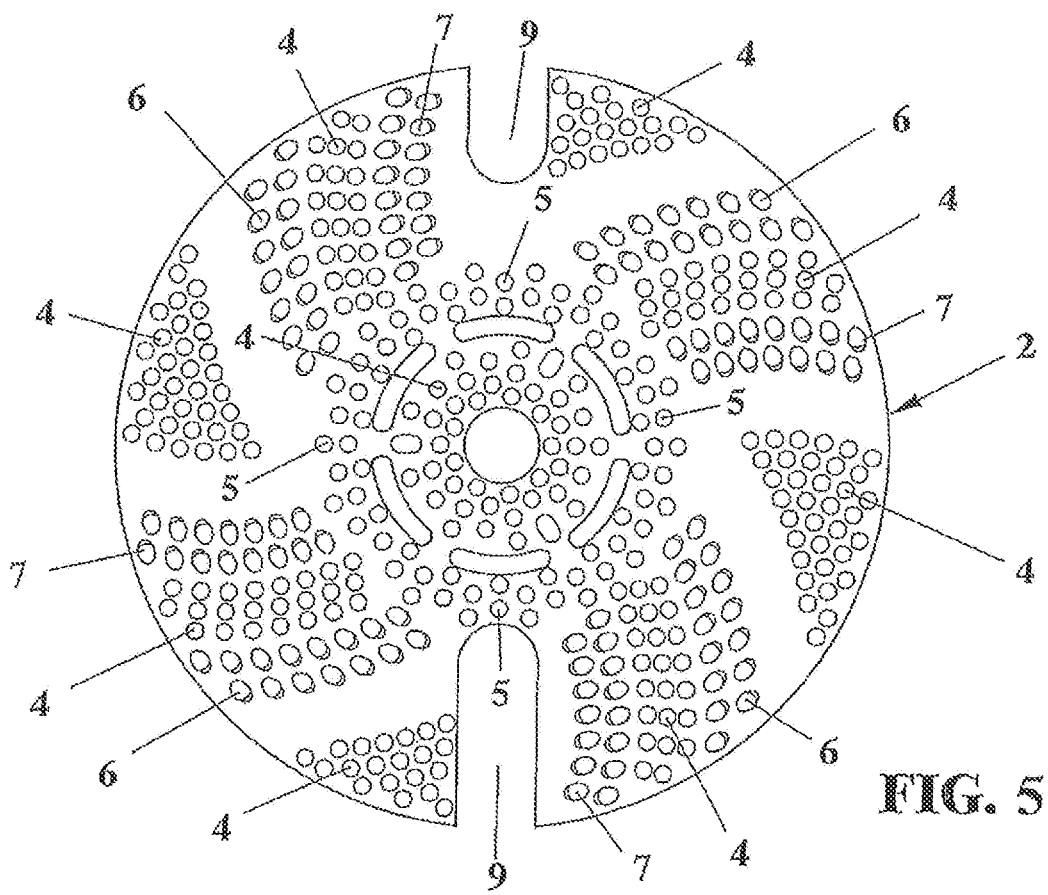
FIG. 5 is a plan view of the base plate of the brush according to the invention.
Figure 6:
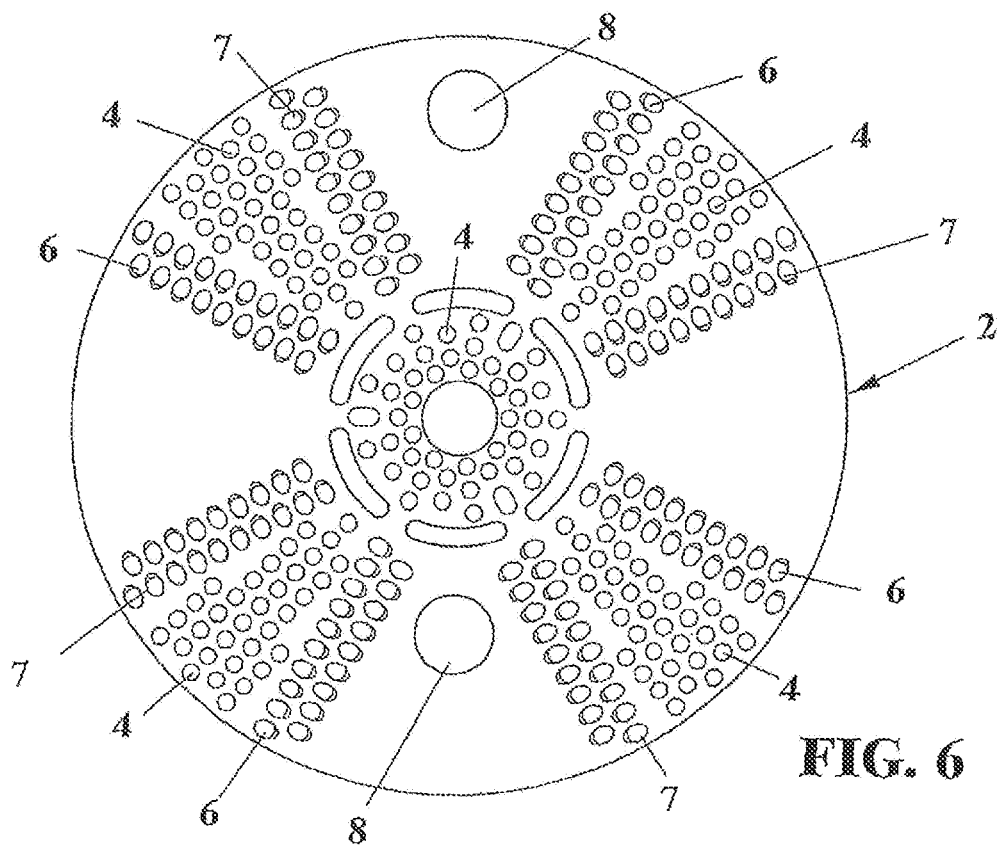
FIG. 6 is a plan view of the base plate of the brush according to a further aspect of the invention.
Figure 7:
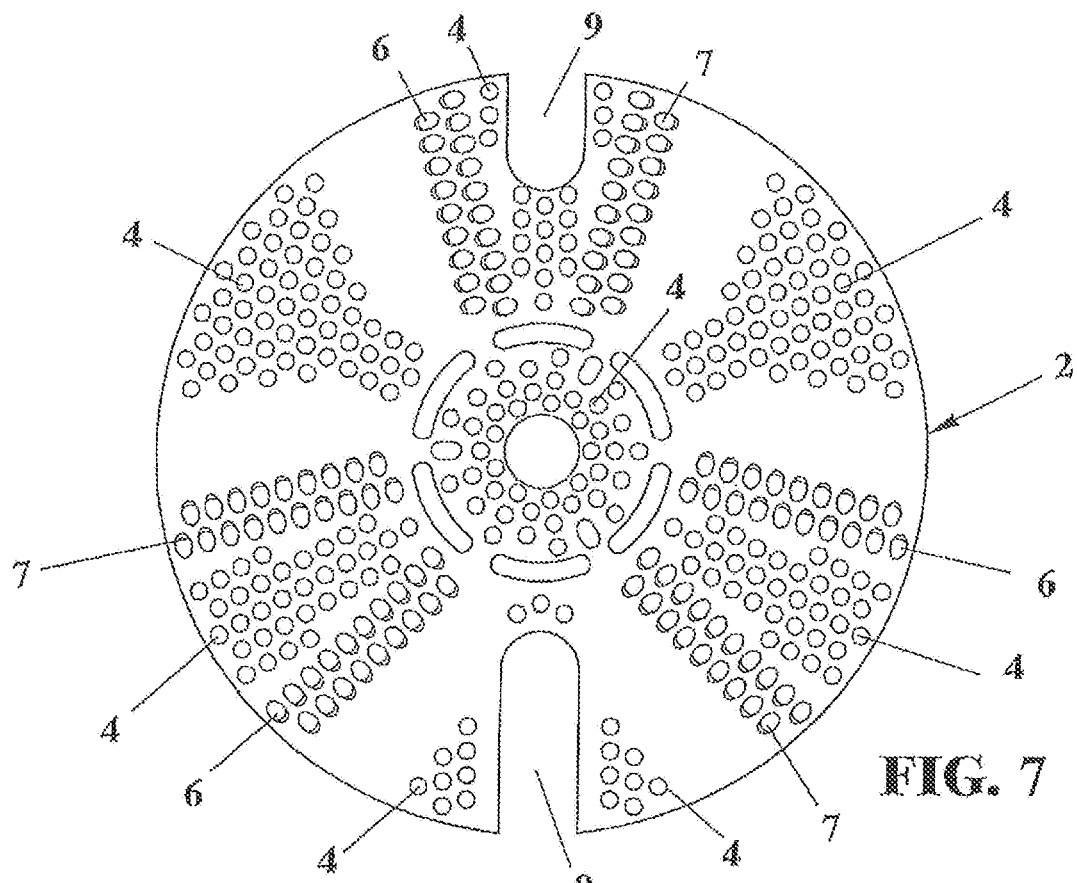
FIG. 7 is a plan view of the base plate of the brush according to a further aspect of the invention.
Figure 8:
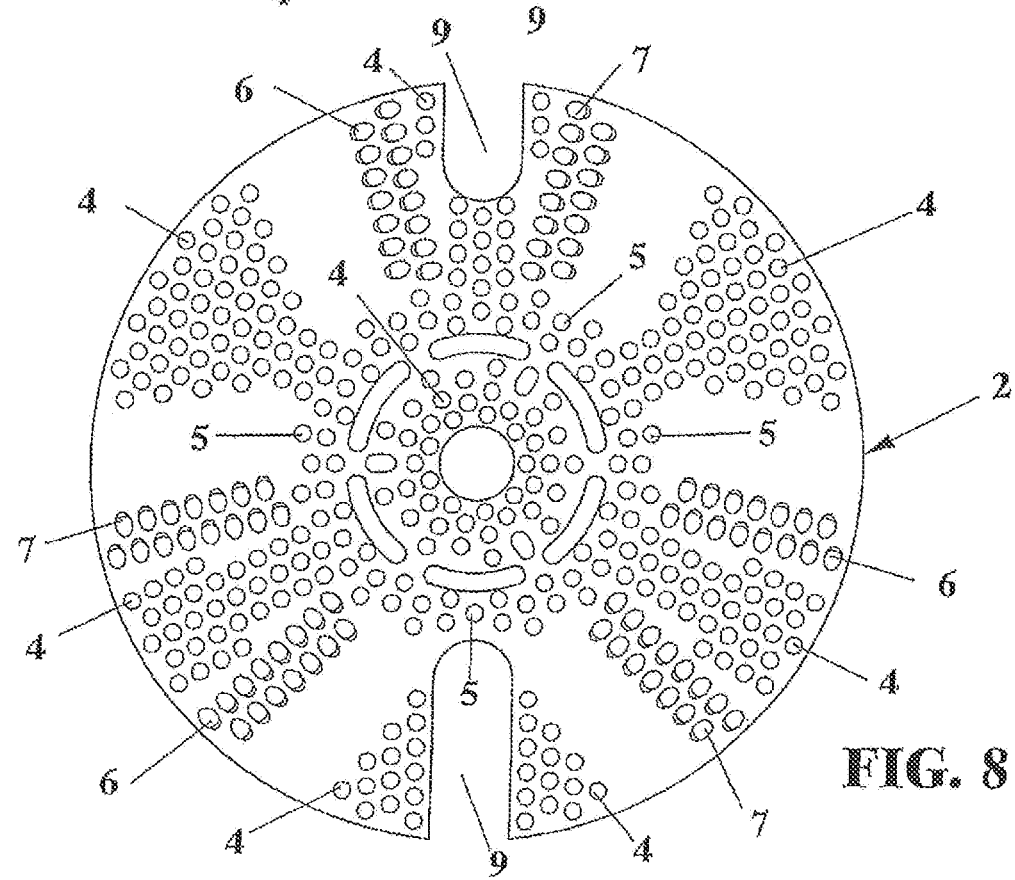
FIG. 8 is a plan view of the base plate of the brush according to a further aspect of the invention.
Figure 9:
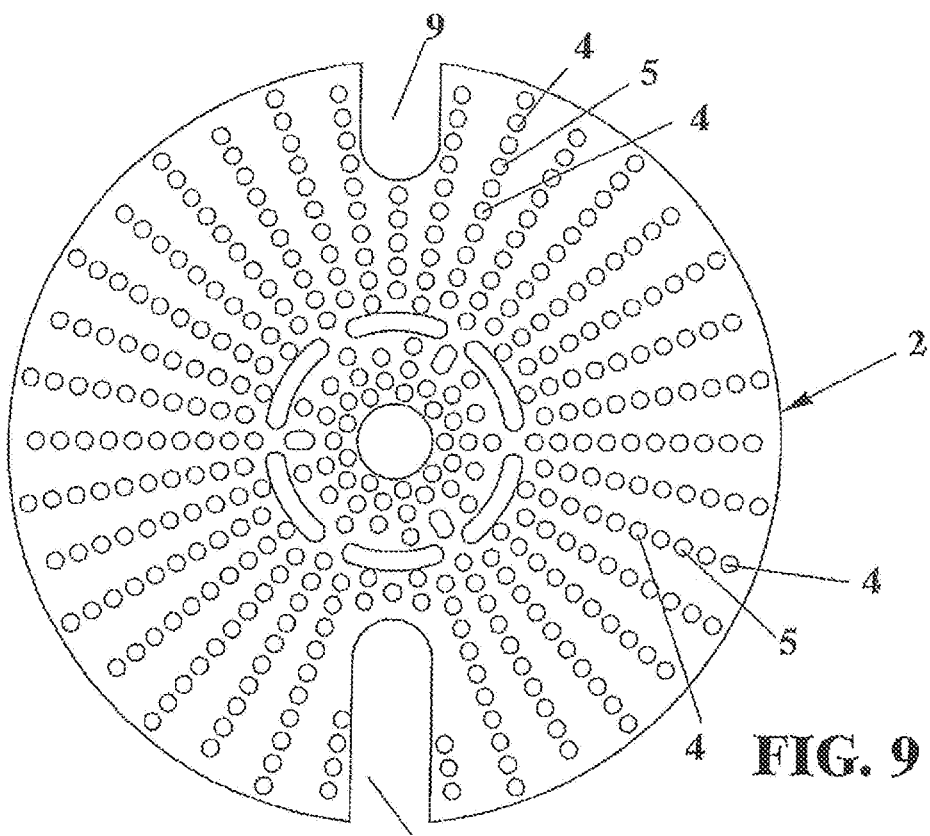
FIG. 9 is a plan view of the base plate of the brush according to a further aspect of the invention.

FIGS. 1, 2 and 5 illustrate a brush construction provided with a plate 2 in which the bristles 3 are arranged according to at least five sets with different tilts.

Some bristles are arranged in a first set in which the bristles are straight, i.e. perpendicular to the plate 2.

In FIGS. 5-10 the reference number 4 indicates the holes made in the plate 2 and into which the straight bristles of the first set are inserted and fixed.

FIGS. 5-10 indicate only some of the numerous different configurations that the bristles can adopt and are used only to illustrate that the plate 2 can be perforated in various ways to arrange the bristles according to different configurations.

For example, some bristles are arranged in a second set in which the bristles have a slight tilt in an anticlockwise direction with respect to the plate 2.

Other bristles are arranged in a third set in which the bristles have a slight tilt in a clockwise direction with respect to the plate 2.

Other bristles are arranged in a fourth set in which the bristles have a greater tilt in an anticlockwise direction with respect to the plate 2.

Other bristles are arranged in a fifth set in which the bristles have a greater tilt in a clockwise direction with respect to the plate 2.

Further sets of bristles with tilts, directions and heights that are all different can be provided.

Merely by way of example, in FIGS. 5-10 the reference number 5 indicates the holes made in the plate 2 for the bristles with a slight clockwise or anticlockwise tilt, the reference number 6 indicates the holes made in the plate 2 for the bristles with a greater anticlockwise tilt, the reference number 7 indicates the holes made in the plate 2 for the bristles with a greater clockwise tilt.

The tilt of the bristles is variable, by way of example, from 90°, for the straight bristles that are perpendicular to the plate, to about 40° for the bristles with a greater tilt.

As visible in FIGS. 1 and 2, the bristles have from two to three different heights and can be made of different materials and/or colours.

The base plate 2 further has holes 8 or recesses 9 for the passage of jets of high-pressure water and of the detergents used in the existing washing systems.

FIGS. 5-10 illustrate base plates 2 that are perforated in a different manner for different configurations and combinations of sets of bristles.

The embodiments illustrated in the figures show some of the multiple combinations of sets of bristles of different tilts and angles and a person skilled in the art can choose the most suitable combinations according to requirements.

Opportunely, the brush construction 1 comprises a plurality of sets of bristles 3. At least one of such sets has bristles 3 that are tilted clockwise (it being understood that the bristles 3 extend from the plate 2 along a sense and a direction that has at least one clockwise component—there could be or not be one radial component—). In addition or alternatively, at least one of such sets has bristles 3 that are tilted anticlockwise (it being understood that the bristles 3 extend from the plate 2 along a sense and a direction that has at least one anticlockwise component—there could also be or not be one radial component—). Preferably, at least one set has bristles 3 that are tilted clockwise and at least one set has bristles 3 that are tilted in an anticlockwise direction. The clockwise or anticlockwise direction is evaluated with reference to a user which is in front of the brush construction 1 and observes the bristles 3 from the front (and thus the face of the plate 2 from which the bristles extend).

Opportunely, at least two sets consist of bristles 3 that are tilted clockwise, preferably one of said two sets has bristles 3 with a greater clockwise tilt than the bristles 3 of the other set. Opportunely, at least two sets consist of bristles 3 that are tilted anticlockwise, preferably one of said two sets has bristles 3 with a greater anticlockwise tilt than the bristles 3 of the other set.

Opportunely, at least one imaginary circumference exists that extends coaxially to the rotation axis of the plate 2 and along which two sets of bristles 3 follow one another (advantageously consecutive to one another without the interposition of other sets of bristles), the bristles 3 of which have a different tilt and/or different height. Opportunely, at least one circumference exists that extends coaxially to the rotation axis of the plate 2 along which two sets of bristles 3 that have bristles 3 that are tilted clockwise, but with a different tilt follow one another (a similar thing can be repeated with the anticlockwise direction).

Opportunely, at least one circumference exists that extends coaxially to the rotation axis of the plate 2 along which two sets of bristles 3 that have bristles 3 that are tilted in a clockwise and/or anticlockwise direction follow one another.

As exemplified in the attached figures, advantageously the bristles 3 extend away from the plate 2, starting from the same face, which advantageously lies on the same plane (preferably orthogonal to the rotation axis of the plate 2). Along the plate 2, a plurality of holes connecting the bristles 3 to the plate 2 are opportunely obtained. These holes extend inside the plate 2 to house a portion of the bristles 3 so as to permit fixing thereof to the plate 2. At least some of these holes protrude inside the plate 2 along a clockwise and/or anticlockwise direction (such that the corresponding bristles can then extend respectively in an anticlockwise and/or clockwise direction).

Figure 10:
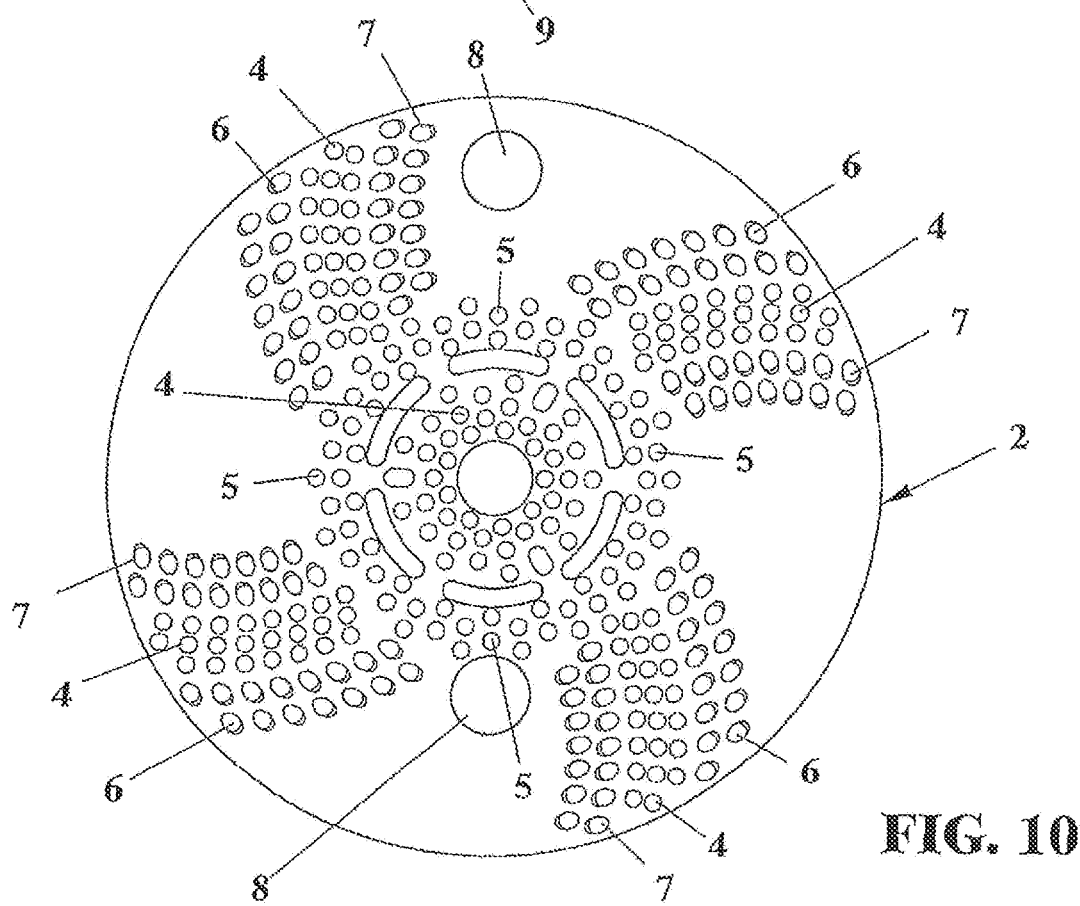
FIG. 10 is a plan view of the base plate of the brush according to a further aspect of the invention.
Figure 11:
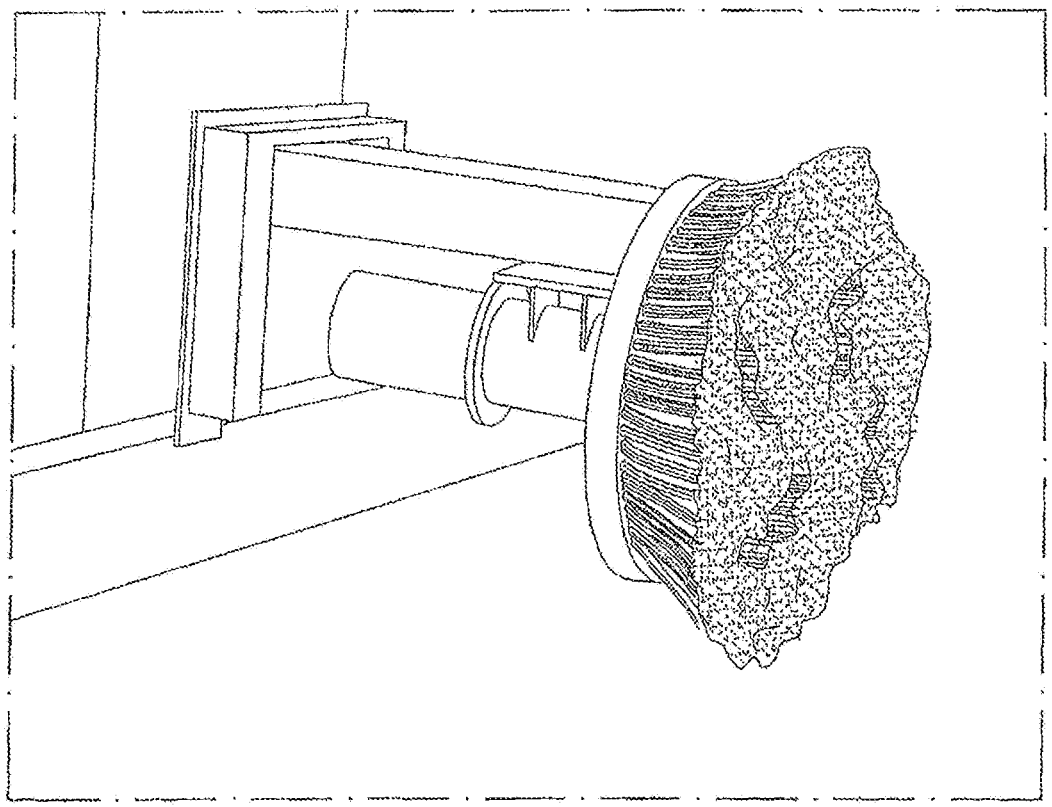
FIG. 11 is a perspective view of a brush of traditional type fitted to the support and illustrated in use position.

In addition, the holes are distributed along said face of the plate 2 in a radial direction and/or also describe arcs that from a radially more internal position extend to a radially more external position (see for example FIG. 5 or FIG. 10).

Tilt can be defined as the angle formed by the bristle 3 that extends away from the plate with the plane of the plate 2 or more generally with an imaginary plane that is orthogonal to the rotation axis of the plate 2. In this connection, the preponderant longitudinal extension of the entire bristle is taken into consideration (this occurs with a rotating or stationary plate 2).

The presence of bristles tilted in all the directions, i.e. not only radially outwards as in today's wheel washers, and arranged in sets with various geometries enables the brush construction to penetrate better between the spokes of the rims.

Figure 3:
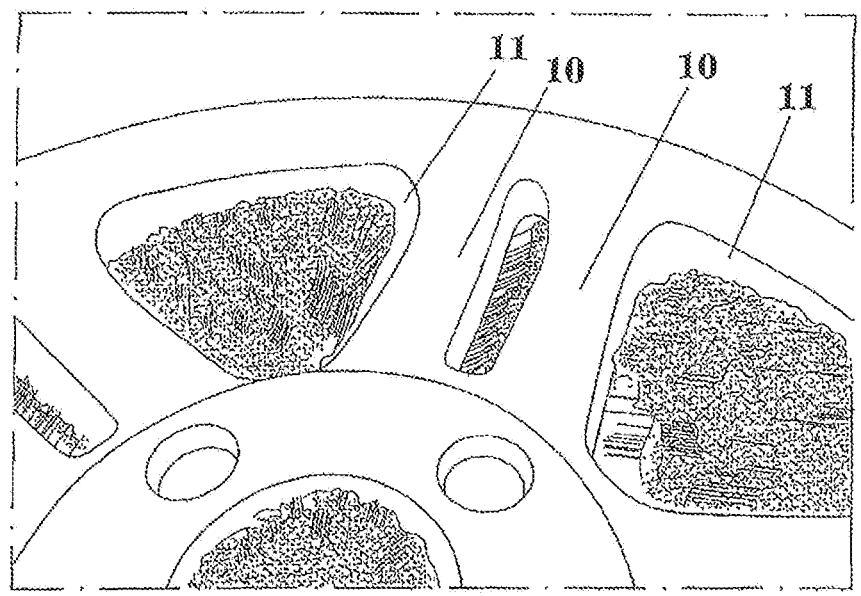
FIG. 3 is a perspective view of a portion of the inner part of a spoked wheel, illustrated during the cleaning action performed by a traditional brush.

In FIG. 3 the action is illustrated schematically of a traditional brush on a spoked wheel, where it is clear that the bristles cannot penetrate between the spokes because the front bristles, in the rotation direction, by bending when coming into contact with the spoke, move the rear bristles, which cannot reach the side part 11 of the spoke 10.

In practice, with a traditional brush, only the external face of the spokes is touched by the bristles whereas the sides are not reached completely.

Figure 4:
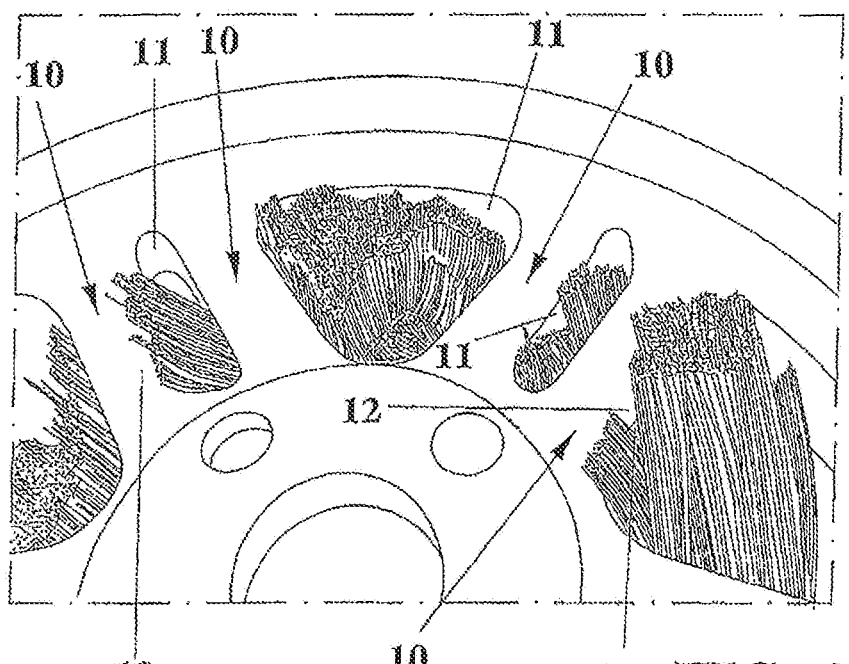
FIG. 4 is a perspective view similar to the preceding view but in which the inner part of the spoked wheel is illustrated during the cleaning action performed by the brush according to the present invention.

FIG. 4 shows on the other hand the action of the brush construction according to the present invention, where it is clear that the rear bristles, which are higher than the front bristles and are provided with a suitable tilt, are not only able to reach and clean the sides 11 of the spoke 10 but also touch the inner part 12 of the rim.

Using empty spaces between the various bristles or the various sets of bristles enables the bristles to be "unloaded", enabling the bristles to be tilted and preventing the front bunches from bending the rear bunches during circular motion, decreasing the washing force.

The plate 2 is preferably circular with a diameter that goes from approximately 50 to 10 cm and is makeable in various forms and configurations.

The plate 2 is fixable to the mechanical support of the wheel-cleaning device, which is not illustrated in the figures, in a central or offset position.

The bristles can be made of PE, PP, PA or of any other plastics polymer that is deemed to be suitable for these applications.

The bristles can further consist of closed and non-closed cell expanded material strips, felt, fabric, microfibres or coupled materials.

The brush construction according to the present invention can further comprise bristles made of materials that are suitable for drying such as felt, fabric, microfibres or coupled materials provided with absorbing and/or polishing power.

In practice, it has been noted that the invention fully achieves the prefixed task and aims.

A brush construction has been made that is specially designed for wheel-washing devices of motor vehicle systems, which ensures deeper and more effective washing in the zones of the rim that are more difficult to reach, and especially the side part of the spokes of alloy rims.

The brush construction that is the object of the present invention further enables the consumption of water and chemical detergents to be reduced.

Another important advantage of the present brush construction consists of the fact that it is usable on current equipment without modifications and without the aid of costly adapters.

Naturally, any materials, dimensions and configurations can be used, according to requirements.

The invention claimed is:

1. A brush construction for motor vehicle washing systems, comprising a base plate (2) supporting a plurality of bristles (3) each of which has a base end (31), fixed to the plate (2) and a free end (32); wherein
    said base plate (2) includes an outer edge and is suitable for being removably fixed to a rotary structure that is suitable for rotating said base plate (2) around a central axis thereof;
    said bristles (3) comprise sets of bristles which in turn comprise:
        (i) a left set of bristles at the left portion of the base plate;
        (ii) a right set of bristles at the right portion of the base plate;
        (iii) a top set of bristles at the top portion of the base plate; and
        (iv) a bottom set of bristles at the bottom portion of the base plate;
    said bristles (3) are fixed to said base plate (2) with different tilts so that angles are formed from the bristles (3) fixed to the base plate (2); and
    said bristles (3) are arranged with mutually converging and/or diverging tilt directions, wherein at least one of said sets of bristles (3) are tilted in a counter-clockwise direction with respect to a rotary direction of the plate (2) or at least one of said sets of bristles (3) are tilted in a clockwise direction with respect to the rotary direction of the plate (2); wherein the left set, the right set, the top set, and the bottom set of bristles form an acute angle with the corresponding clockwise or counter-clockwise directional line that is tangent to the edge.

2. The brush construction, according to claim 1, characterized in that the degree of tilt of each bristle (3), that is the angle formed by the bristle (3) with the plate base (2), is variable.

3. The brush construction, according to claim 1, characterized in that said bristles (3) are fixed to said plate (2) so as to be arranged at a given spacing from one another to reduce the interaction between the bristles when they are bent during use.

4. The brush construction, according to claim 1, characterized in that said bristles (3) are fixed to said plate (2) in said sets (4, 5, 6, 7), which are separated by free zones thereby to maintain a spacing between the sets of bristles with different tilts to reduce the interaction between the bristles when they are bent during use.

5. The brush construction, according to claim 1, characterized in that the bristles (3) have different heights.

6. The brush construction, according to claim 1, characterized in that said sets of bristles comprise at least a first set in which the bristles (3) are straight, that is perpendicular to the plate (2).

7. The brush construction, according to claim 1, wherein said sets of bristles comprise at least a set in which the bristles (3) have a greater tilt in a counter-clockwise direction with respect to the plate (2).

8. The brush construction, according to claim 1, wherein said sets of bristles comprise at least a set in which the bristles (3) have a greater tilt in a clockwise direction with respect to the plate (2).

9. The brush construction, according to claim 1, characterized in that said sets of bristles comprise different sets of bristles of different heights and tilts and different tilt directions, either diverging or converging.

10. The brush construction, according to claim 1, characterized in that said base plate (2) has holes (8) or recesses (9) for the passage of jets of high-pressure water and detergents.

11. The brush construction, according to claim 1, characterized in that the sets of bristles are made of different materials that are suitable for performing washing or drying operations.

12. The brush construction, according to claim 1, characterized in that the bristles (3) are made of PE, PP, PA or any other plastics polymer deemed to be suitable for these applications.

13. The brush construction, according to claim 1, characterized in that the bristles (3) consist of closed or non-closed cell expanded material strips, felt, fabric, microfibres or coupled material strip.

14. The brush construction, according to claim 1, wherein said bristles (3) are fixed to said base plate (2) with different tilts both in radial directions, inwardly and outwardly, and in a non-radial direction, either in a clockwise or a counter-clockwise direction, with respect to a rotary direction of the base plate (2).

15. The brush construction, according to claim 1, wherein, along the plate (2), there are a plurality of holes connecting the bristles (3) to the plate (2); at least some of said holes protruding inside the plate (2) along a clockwise and/or counter-clockwise direction such that the corresponding bristles extend respectively in a counter-clockwise and/or clockwise direction.

* * * * *